United States Patent
Mogami et al.

(10) Patent No.: US 6,214,896 B1
(45) Date of Patent: Apr. 10, 2001

(54) WATER-CONTAINING POLYPROPYLENE RESIN COMPOSITION AND PRE-EXPANDED PARTICLES MADE THEREOF

(75) Inventors: Kenji Mogami; Yasumitsu Munakata; Kenichi Senda, all of Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/472,183

(22) Filed: Dec. 27, 1999

(30) Foreign Application Priority Data

Dec. 28, 1998 (JP) .................................................. 10-372755

(51) Int. Cl.⁷ ....................................................... C08J 9/22
(52) U.S. Cl. ................................. 521/58; 521/59; 521/134
(58) Field of Search ............................... 521/58, 59, 134; 264/DIG. 16

(56) References Cited

U.S. PATENT DOCUMENTS

| | | | | |
|---|---|---|---|---|
| 5,821,272 | * | 10/1998 | Ochikoshi et al. | 521/58 |
| 5,883,141 | * | 3/1999 | Mihayashi et al. | 521/58 |
| 5,942,551 | * | 8/1999 | Ichimura et al. | 521/58 |
| 6,130,266 | * | 10/2000 | Mihayashi et al. | 521/58 |

* cited by examiner

*Primary Examiner*—Morton Foelak
(74) *Attorney, Agent, or Firm*—Armstrong, Westerman, Hattori, McLeland & Naughton, LLP

(57) ABSTRACT

There is provided a pre-expanded particle having a high expansion ratio and excellent flexibility and cushioning property. The in-mold articles made thereof do not lose mechanical strength, heat resistance, and water resistance, without conventional volatile organic foaming agents or carbon dioxide gas. A pre-expanded particle of a polypropylene resin is prepared by pre-expanding a water-containing propylene resin composition comprising (A) 100 parts by weight of a polypropylene resin having melt flow rate (230° C., 2.16 kg load) of 10 to 70 g/10 min and tensile elongation at break of at least 300%, (B) 0.05 to 10 parts by weight of a hydrophilic polymer and (C) 0 to 3 parts by weight of a filler and having a water content of 1 to 20% by weight under a water vapor pressure at the melting point of the polypropylene resin, said particle having an apparent expansion ratio of 25 to 70 times, a closed cell content of at least 85% and an average cell diameter of 50 to 500 $\mu$m.

6 Claims, No Drawings

WATER-CONTAINING POLYPROPYLENE RESIN COMPOSITION AND PRE-EXPANDED PARTICLES MADE THEREOF

BACKGROUND OF THE INVENTION

The present invention relates to a polypropylene resin composition having an improved water content and pre-expanded particles made thereof. More particularly, the present invention relates to a water-containing polypropylene resin composition employed for preparation of pre-expanded particles which can be suitably employed, for example, as a raw material for in-mold foamed articles, and pre-expanded particles made thereof.

As a process to obtain pre-expanded particles of a polypropylene resin, the process has been conventionally known, wherein polypropylene resin particles containing a blowing agent are dispersed in an aqueous dispersion medium, and heated to a temperature not lower than the softening point of the resin with maintaining a pressure in the vessel not less than vapor pressure of the blowing agent, and then released into an atmosphere of lower pressure than that in the vessel to expand the particles (for example, Japanese Unexamined Patent Publication No.77174/1977).

In general, a blowing agent such as a volatile organic blowing agent or carbon dioxide gas has been needed to prepare pre-expanded particles in the process for preparing pre-expanded particles. Since a water content under water vapor pressure at the melting point of polypropylene resin is less than 1% by weight and it is difficult to pre-expand polypropylene as water-containing particles made thereof.

However, the volatile organic blowing agent is not preferable, since propane, butane and the like have problems concerning safety and chlorofluorocarbon and the like have problems in an environmental point of view such as destruction of the ozone layer. Furthermore, it has been known that a volatile blowing agent has difficulty in controlling an expansion ratio.

On the other hand, carbon dioxide gas is not preferably employed from the viewpoint of global warming. And the cost of apparatus becomes high, since it needs a large-scale apparatus to make high pressure during preparation of pre-expanded particles.

As a method to solve the above-mentioned problems, there has been proposed a method by expanding polypropylene resin particles containing 30 to 50% by weight of an inorganic filler by using dispersion medium water as a blowing agent (Japanese Examined Patent Publication No.2183/1974).

However, this method has problems that adhesion between particles is insufficient at in-mold molding and that mechanical strength and flexibility of the obtained articles become low, since a large amount of a filler is employed.

On the other hand, as a method for obtaining polypropylene resin pre-expanded particles by using dispersion medium water as a blowing agent, there has been proposed a method by using a random copolymer of ethylene and propylene having an ethylene content of 4 to 10% by weight and containing 0.4 to 10% by weight of a higher fatty acid metal salt having 12 to 22 carbon atoms as a base resin (Japanese Unexamined Patent Publication No.188435/1985), or a method by using a copolymer of ethylene and propylene having an ethylene content of 2 to 10% by weight as a base resin and adjusting an initial internal pressure in a vessel before heating to 5 kg/cm$^2$ G with inorganic gas (Japanese Unexamined Patent Publication No.221440/1985).

However, these methods lack productivity and economy, and particle adhesion is easy to occur in a dispersion medium, since they need heating condition at 160° C., for at least 10 hours to obtain pre-expanded particles having a high expansion ratio by using these methods.

Therefore, there has been recently desired a method for preparing polypropylene resin pre-expanded particles having desired properties without blowing agents such as a volatile organic blowing agent and carbon dioxide gas, which have been conventionally needed.

In order to solve the above-mentioned problems, the present inventors developed and filed a method for preparing pre-expanded particles having desired properties without a volatile blowing agent or carbon dioxide gas (Japanese Unexamined Patent Publication No.84124/1996). The method comprises preparing particles of a polypropylene resin and a hydrophilic polymer as base resins, which has an improved water content, dispersing them into an aqueous dispersion medium in an air-tight vessel, heating them at a temperature not lower than the softening point of polypropylene to obtain a water content of 1 to 50% by weight, and releasing them into an atmosphere of low pressure to expand the particles containing water.

By using the pre-expanded particles prepared by the above-mentioned method, a foamed articles having an excellent mechanical strength, heat resistance and water resistance can be obtained in case of a low expansion ratio, in spite of employing no volatile blowing agent or carbon dioxide gas.

However, pre-expanded particles having a higher expansion ratio (an apparent expansion ratio of at least 25 times) are needed in cushioning material use which requires excellent flexibility and cushioning property. Since at least 5 parts by weight of a filler and more than 10 parts by weight of a hydrophilic polymer must be employed based on 100 parts by weight of a polypropylene resin in order to obtain pre-expanded particles having such a high expansion ratio, a foamed article obtained by expanding such pre-expanded particles has problems that the above properties (mechanical strength, heat resistance and water resistance) become lower, they can not be employed in uses requiring excellent properties, and cost for preparation thereof becomes higher.

SUMMARY OF THE INVENTION

In order to solve the above-mentioned problems on the conventional techniques and provide a process for preparing polypropylene resin pre-expanded particles having desired properties without a volatile blowing agent or carbon dioxide gas, it has been found out to prepare pre-expanded particles having desired properties, even if amounts of a hydrophilic polymer and a filler are decreased, by employing a polypropylene resin having melt flow rate (230° C., 2.16 kg load) of 10 to 70 g/10 min and tensile elongation at break of at least 300% as the polypropylene resin described in Japanese Unexamined Patent Publication No.84124/1996, and thereby preparing a foamed article suitable for uses requiring excellent properties under a relatively safe condition free from environmental problems.

The present invention relates to a water-containing polypropylene resin composition comprising (A) 100 parts by weight of a polypropylene resin having melt flow rate (230° C., 2.16 kg load) of 10–70 g/10 min and tensile elongation at break of at least 300%, (B) 0.05–10 parts by weight of a hydrophilic polymer, and (C) 0–3 parts by weight of a filler, and having a water content of 1 to 20% by weight under a water vapor pressure at the melting point of polypropylene resin (based on a total amount of (A)component and (B) component) (Claim 1), the water-containing polypropylene resin composition of Claim 1, wherein the polypropylene resin is a random copolymer of ethylene and propylene (Claim 2), the water-containing polypropylene resin composition of Claim 1, wherein the hydrophilic polymer is an ionomer resin comprising a copolymer of ethylene and (meth)acrylic acid crosslinked intermolecularly with a metal ion (Claim 3), the water-containing polypropylene resin composition of Claim 1, wherein the metal ion is an alkali metal ion (Claim 4), the water-containing polypropylene resin composition of Claim 1, wherein the filler is talc (Claim 5), a pre-expanded particle of a polypropylene resin prepared by pre-expanding a water-containing polypropylene resin composition comprising (A) 100 parts by weight of a polypropylene resin having melt flow rate (230° C., 2.16 kg load) of 10–70 g/10 min and tensile elongation at break of at least 300%, (B) 0.05–10 parts by weight of a hydrophilic polymer and (C) 0–3 parts by weight of a filler and having a water content of 1 to 20% by weight under a water vapor pressure at the melting point of propylene resin, which has an apparent expansion ratio of 25 to 70 times, a closed cell content of at least 85% and average cell diameter of 50 to 500 $\mu$m (Claim 6), the pre-expanded particle of Claim 6, wherein the polypropylene resin is a random copolymer of ethylene and propylene (Claim 7), the pre-expanded particle of a polypropylene resin of Claim 6, wherein the hydrophilic polymer is an ionomer resin comprising a copolymer of ethylene and (meth)acrylic acid crosslinked intermolecularly with a metal ion (Claim 8 the pre-expanded particle of a polypropylene resin of Claim 8, wherein the metal ion is an alkali metal ion (Claim 9), the pre-expanded particle of a polypropylene resin of Claim 6, wherein the filler is a talc (Claim 10), and the pre-expanded particle of a polypropylene resin of Claim 6, wherein the particle has a peak at a temperature higher than an intrinsic peak based on a melting point of a polypropylene resin in a DSC curve measured by differential scanning calorimeter (Claim 11).

DETAILED DESCRIPTION

In the present invention, a polypropylene resin as an (A) component having melt flow rate (230° C., 2.16 kg load) of 10 to 70 g/10 min, preferably 20 to 50 g/10 min, and tensile elongation at break of at least 300%, preferably at least 450% can be employed as a base resin.

If the melt flow rate is less than 10 g/10 min, it is difficult to obtain pre-expanded particles having a high expansion ratio, since a melt viscosity is too high to expand the particle even if the particle having an improved water content is employed. On the other hand, if the melt flow rate is more than 70 g/10 min, it is difficult to obtain pre-expanded particles having a high expansion ratio, since a melt viscosity is low against elongation of a resin during expansion, and it is easy to break cells. Melt flow rate described herein is a property showing flowability during melting of a resin, and is measured at 230° C. under 2.16 kg load by a method according to ASTM D 1238.

If the tensile elongation at break is less than 300%, the flexibility and cushioning properties of a molded article comprising the pre-expanded particles become lowered, and it is difficult to employ as a cushioning material. Usually, the upper limit of the tensile elongation at break is approximately 1000%. Tensile elongation at break described herein is a property showing a flexibility of a resin and is measured at a room temperature by a method according to ASTM D 638.

As the other properties of the polypropylene resin (A), flexural preferably 8,000 to 16,000 kg/cm$^2$, and a melting point (DSC method) is preferably 125 to 165° C., more preferably 135 to 155° C. If the flexural modulus is less than 5,000 kg/cm$^2$, mechanical strength and heat resistance of the obtained foamed article tend to be insufficient. If it is more than 20,000 kg/cm$^2$, flexibility and cushioning property of the obtained foamed article tend to be insufficient. On the other hand, heat resistance tends to be insufficient in case of a melting point of less than 125° C., and adhesion property at molding and secondary foamability tend to be insufficient in case of more than 165° C.

The polypropylene resin (A) is a resin comprising 50 to 100% by weight, especially 70 to 100% by weight, of propylene monomer unit, and 0 to 50% by weight, especially 0 to 30% by weight, of a monomer unit copolymerizable with the propylene monomer. Since the polypropylene resin (A) contains at least 50% by weight of propylene monomer unit, the obtained molded article is light and excellent in heat resistance, mechanical strength, processability, electrical insulation, water resistance and chemical resistance. The monomer unit copolymerizable with a propylene monomer is a component employed for improving properties such as impact resistance, flexibility, processability, adhesion, transparency and gas barrier property. The content thereof is preferably 0.05 to 8% by weight, more preferably 0.1 to 5% by weight to obtain sufficient effects by the use thereof.

Examples of the monomer copolymerizable with the propylene monomer are $\alpha$-olefin monomers having 2 to 8 carbon atoms such as ethylene, butene, pentene, hexene, heptene and octene except for propylene, cyclic olefin monomers such as a norbornene monomer, vinyl alcohol esters such as vinyl acetate, alkyl (meth)acrylate having 1 to 6 alkyl carbon atoms such as methyl methacrylate, ethyl acrylate and hexyl acrylate, vinyl alcohol, methacrylic acid, vinyl chloride and the like. Among them, ethylene is preferable from the viewpoints of low cost, impact resistance, flexibility and processability; vinyl chloride is preferable from the viewpoint of adhesion, flexibility and property at a low temperature, methyl methacrylate is preferable from the viewpoint of adhesion, flexibility, property at a low temperature and thermal stability. These may be employed solely or in a combination use of two or more thereof.

Examples of the polypropylene resin (A) are, for instance, polypropylene resins such as a random copolymer of ethylene and propylene, a random terpolymer of ethylene, propylene and butene, a block copolymer of polyethylene and polypropylene and a homopolymer of polypropylene. The polypropylene resin (A) may not be crosslinked, or may be branched or crosslinked by means of peroxides or radiation. These polymers may be employed solely or in a combination use of two or more thereof. Among them, a random copolymer of ethylene and propylene is preferable, since pre-expanded particles having excellent moldability and a high expansion ratio are easily obtained, and a molded article made thereof has good balance among mechanical strength, heat resistance, flexibility and a cushioning property.

A hydrophilic polymer (B) employed in the present invention is a component used for adjusting a water content of a water-containing polypropylene resin composition to a predetermined content.

The hydrophilic polymer (B) means a polymer having a water absorption ratio measured according to ASTM D570 of at least 0.5% by weight and it contains so-called a hygroscopic polymer, a water-absorptive polymer and a water-soluble polymer. The hydrophilic polymer (B) can contain hydrophilic groups such as a carboxyl group, a hydroxy group, an amino group, an amido group, an ester group and a polyoxyethylene group in its molecule.

Examples of the hygroscopic polymer are a polymer containing a carboxyl group, polyamide, thermoplastic polyester elastomer, cellulose derivatives and the like.

Examples of the polymer containing a caboxyl group are, for instance, a terpolymer of ethylene, acrylic acid and maleic anhydride (water absorption of 0.5 to 0.7% by weight), an ionomer resin (water absorption 0.7 to 1.4% by weight) wherein carboxyl groups of an ethylene-(meth) acrylic acid copolymer are salted with a metal ion, preferably with an alkali metal ion such as sodium ion or potassium ion for intermolecular crosslinking, a copolymer of ethylene and (meth)acrylic acid (water absorption 0.5 to 0.7% by weight) and the like. These may be employed solely or in a combination use of two or more thereof.

Examples of the polyamide are, for instance, nylon-6 (water absorption of 1.3 to 1.9% by weight), nylon-66 (water absorption of 1.1 to 1.5% by weight), copolymerized nylon (available from EMS-CHEMIE AG, Griltex; water absorption of 1.5 to 3% by weight) and the like. These may be employed solely or in a combination use of two or more thereof.

Examples of the thermoplastic polyester elastomer are, for instance, a block copolymer of poly(butylene terephthalate) and poly(tetramethylene glycol) (water absorption of 0.5 to 0.7% by weight) and the like. These may be employed solely or in a combination use of two or more thereof.

Examples of the cellulose derivatives are, for instance, cellulose acetate, cellulose propionate and the like. These may be employed solely or in a combination use of two or more thereof.

The above-mentioned water-absorptive polymer means a polymer which can not be dissolved in water, absorb water in an amount of several to several hundreds times of the weight of its own, and is difficult to be dehydrated even if pressure is applied.

Examples of the above-mentioned water-absorptive polymer are a crosslinked acrylic acid salt polymer, a graft copolymer of starch and acrylic acid, a crosslinked poly(vinyl alcohol), a crosslinked poly(ethylene oxide), a copolymer of isobutylene and maleic acid, and the like. Theses may be employed solely or in a combination use of two or more thereof.

Examples of the crosslinked acrylic acid salt polymer are, for instance, a crosslinked polymer of sodium acrylate such as Aqualic available from Nippon Shokubai Co., Ltd. or Diawet available from Mitsubishi Chemical Corporation, and the like. These may be employed solely or in a combination use of two or more thereof.

Examples of the crosslinked poly(vinyl alcohol) are, for instance, various of crosslinked poly(vinyl alcohol) such as Aquareserve GP available from Nippon Gohsei Kagaku Kogyo Kabushiki Kaisha and the like. These may be employed solely or in a combination use of two or more thereof.

Examples of the crosslinked poly(ethylene oxide) are, for instance, various crosslinked poly(ethylene oxide) such as Aquacork available from Sumitomo Seika Chemicals and the like. These may be employed solely or in a combination use of two or more thereof.

Examples of the copolymer of isobutylene and maleic acid are, for instance, various copolymers of isobutylene and maleic acid such as KI Gel available from Kuraray Co., Ltd., and the like. These may be employed solely or in a combination use of two or more thereof.

The above-mentioned water-soluble polymer means a polymer, which can be dissolved in water at a room temperature or a higher temperature.

Examples of the above-mentioned water-soluble polymer are (meth)acrylic acid polymer, (meth)acrylic acid salt polymer, polyvinyl alcohol), poly(ethylene oxide), water-soluble cellulose derivatives, and the like. These may be employed solely or in a combination use of two or more thereof.

Examples of the (meth)acrylic acid polymer are, for instance, poly(acrylic acid), a copolymer of acrylic acid and ethyl acrylate, poly(2-hydroxyethyl methacrylate), and the like. These may be employed solely or in a combination use of two or more thereof.

Examples of the (meth)acrylic acid salt polymer are, for instance, poly(sodium acrylate), poly(sodium methacrylate), poly(potassium acrylate), poly(potassium methacrylate) and the like. These may be employed solely or in a combination use of two or more thereof.

Examples of the poly(vinyl alcohol) are, for instance, poly(vinyl alcohol), a copolymer of vinyl alcohol and vinyl acetate, and the like. These may be employed solely or in a combination use of two or more thereof.

Examples of the poly(ethylene oxide) are, for instance, poly(ethylene oxide) having tens of thousands to millions of a molecular weight and the like. These may be employed solely or in a combination use of two or more thereof.

Examples of the water-soluble cellulose derivatives are, for instance, carboxymethyl cellulose, hydroxyethyl cellulose and the like. Theses may be employed solely or in a combination use of two or more thereof.

The above-mentioned hygroscopic polymer, water-absorptive polymer, and water-soluble polymer may be employed solely or in a combination use of two or more thereof.

Among the hydrophilic polymers (B), an ionomer resin prepared by salting carboxyl groups of a copolymer of ethylene and (meth)acrylic acid with a metal ion, preferably an alkali metal ion such as sodium ion, potassium ion and intermolecularly crosslinking is preferable since it has an excellent dispersibility in a polypropylene resin (A) and can provide a water-containing polypropylene resin composition having a high water content in a relative small amount.

An amount of the hydrophilic polymer (B) varies depending on the kind of the hydrophilic polymer (B). Usually, in order to obtain a water-containing polypropylene resin composition having a predetermined water content, it is preferably at least 0.05 part by weight, more preferably at least 0.5 part by weight, based on 100 parts by weight of the polypropylene resin (A). And it is preferably at most 10 parts by weight, more preferably at most 7 parts by weight from the viewpoint of improving the production stability and foaming characteristics in the preparation of pre-expanded particles, imparting excellent mechanical strength and heat resistance to molded articles obtained from the pre-expanded particles, and decreasing the dimensional change of molded articles upon water absorption.

The water-containing polypropylene resin composition of the present invention preferably contains filler (C) from the viewpoint of obtaining pre-expanded particles containing uniform cells and having a high expansion ratio.

Examples of the filler (C) are, for instance, an inorganic filler such as talc, calcium carbonate or calcium hydroxide, and an organic filler, which is solid at a temperature higher than a softening point of the polypropylene resin (A), such as fluororesin powder, silicone resin powder, or thermoplastic polyester resin powder. These may be employed solely or in a combination use of two or more thereof. Among them, talc is preferable from the viewpoint of obtaining pre-expanded particles having uniform cells and a high expansion ratio.

An average particle diameter of the filler (C) is preferably at most 50 $\mu$m, more preferably at most 10 $\mu$m, from the viewpoint of obtaining pre-expanded particles having uniform cells and a high expansion ratio, and obtaining a molded article having excellent mechanical strength and flexibility from the pre-expanded particles. Furthermore, it is preferable at least 0.1 $\mu$m, more preferably at least 0.5 $\mu$m from the viewpoint of secondary agglomeration and handling workablility.

The filler (C) is an optional component, but the amount thereof is at least 0.01 part by weight, more preferably at least 0.1 part by weight, based on 100 parts by weight of the polypropylene resin (A) from the viewpoint of obtaining pre-expanded particles having a high expansion ratio. Furthermore, it is preferably at most 3 parts by weight, more preferably at most 2 parts by weight, from the viewpoint of exhibiting excellent adhesion property at molding of the pre-expanded particles and obtaining a molded article made thereof having excellent mechanical strength and flexibility.

To the water-containing poly propylene resin composition of the present invention, there can be suitably added other additives except for the components (A) to (C), as far as the effect of the present invention is not lost.

Examples of the above-mentioned other additives are, for instance, a thermal stabilizer, a pigment, an antistatic agent, a UV-absorber, a copper inhibitor and the like.

In the present invention, the polypropylene resin composition comprising a polypropylene resin (A), a hydrophilic polymer (B), and filler (C) as an optional, and the like, is preferably obtained by melt-kneading a raw material by means of an extruder, a kneader, a Banbury mixer, a roll and the like. And then the composition is formed into resin particles having desired shapes such as cylindrical, ellipsoidal, spherical, cubic and rectangular parallelepipedic, which are easy to use in pre-expansion.

There is no particular limitation for preparation conditions of the resin particles and size of the resin particles, but the particles obtained by melt-kneading in an extruder are, in general, 0.5 to 10 mg/particle.

A water content of the water-containing polypropylene resin composition is 1 to 20% by weight, preferably 1 to 10% by weight, under water vapor pressure at the melting point of the polypropylene resin (A).

Since the water content in the water-containing polypropylene resin composition is 1 to 20% by weight under water vapor pressure at the melting point of propylene resin (A), the water content of particles made thereof becomes also 1 to 20% by weight, and pre-expanded particles having a high expansion ratio and desired properties are obtained without conventional blowing agents such as a volatile blowing agent and carbon dioxide gas.

If the water content is less than 1% by weight, the apparent expansion ratio becomes less than 25 times. If the water content is more than 20% by weight, the obtained apparent expansion ratio does not so increase. The dispersibility of the particles into the aqueous dispersion medium becomes lowered and, thereby, the resin particles tend to become bulk in the closed vessel at the preparation of the pre-expanded particles, so that it is difficult to obtain uniform pre-expanded particles.

Melting point of the polypropylene resin (A) is measured by peak temperature of melting peak (also hereinafter referred to as intrinsic peak) in a differential scanning calorimeter (DSC) curve obtained from measurement at a rising temperature rate of 10° C./min using a DSC.

The water content under water vapor pressure at the melting point of the polypropylene resin (A) is obtained by the following method.

A 300 ml pressure-resistant ampul is charged with 50 g of particles of the water-containing polypropylene resin composition, 150 g of water, 0.5 g of basic tricalcium phosphate powder as a dispersion agent, and 0.03 g of sodium n-paraffmsulfonate. After the ampul was tightly closed, it was thermally treated for three hours in an oil bath adjusted at a melting temperature of the polypropylene resin (A). After the ampul is cooled to a room temperature, the content thereof is removed and sufficiently washed with water to remove the dispersion agent. Weight (X) of the obtained water-containing particles having no water on the surface thereof is measured. The particles is dried for three hours in an oven adjusted at a temperature 20° C. higher than the melting point of the polypropylene resin (A). Then weight (Y) of the particles cooled to a room temperature in an desiccator is measured to calculate the water content according to the following equation.

Water Content (% by weight)=((X−Y)/Y)×100

In case that the resin particles of the water-containing polypropylene resin composition contain filler and the like, the water content is the value against a sum of the polypropylene resin (A) and the hydrophilic polymer (B).

The pre-expanded particles of polypropylene resin of the present invention are prepared by dispersing the resin particles of the polypropylene resin composition into an aqueous dispersion medium in a closed vessel, heating the resin particles to a temperature of at least the melting point of the polypropylene resin, preferably at least the melting point thereof +5° C., and at most the melt completion temperature of the melting point, preferably at most the melt completion temperature of the melting point thereof −2° C. for 5 to 180 minutes to give water-containing resin particles having a water content of 1 to 20% by weight, preferably 1 to 10% by weight, and releasing the water-containing resin particles and the aqueous dispersion medium into an atmosphere of lower pressure than the innner pressure of the vessel (generally atmospheric pressure), thereby expanding the water-containing resin particles.

In case of releasing the particles containing water and the aqueous dispersion medium from the above-mentioned closed vessel, it is preferable to release them after raising an inner pressure of the vessel to 10 to 70 kg/cm$^2$G by using inorganic gas mainly containing nitrogen or air, from the viewpoint of preventing blocking of particles at releasing tube exit and increasing an expansion ratio by flash effect.

By the way, the above-mentioned end point of the melting point is the temperature, wherein the foot of endothermic peak in a DSC curve obtained by the second heating run returns to the base line at a higher temperature. The second heating run means heating 3 to 7 g of the polypropylene resin composition containing water again to 220° C. at a heating rate of 10° C./min by using DSC, after heating it to 220° C., at a heating rate of 10° C./min and then cooling it to about 40° C., at a cooling rate of 10° C./min.

In case of dispersing the particles into an aqueous dispersion medium in the closed vessel, as a dispersion agent, there can be added, for instance, tricalcium phosphate, basic magnesium carbonate, basic zinc carbonate, calcium carbonate and a small amount of a surfactant such as sodium dodecylbenzene sulfonate, sodium n-paraffin sulfonate or sodium α-olefin-sulfonate. There is no particular limitation for amounts of the dispersion agent and the surfactant, an amount generally employed may be applied.

Examples of the aqueous dispersion medium are typically water, and a mixture of water with at least one solvent selected from the group consisting of ethylene glycol, ethyl alcohol and glycerin. Water is preferable from environmental and economical points of view.

An amount of the resin particles to be dispersed into the aqueous dispersion medium is preferably 5 to 100 parts by weight, more preferably 10 to 70 parts by weight based on 100 parts by weight of the aqueous dispersion medium. If the amount is less than 5 parts by weight, the productivity becomes lowered, thus being uneconomical. If the amount is more than 100 parts by weight, the resin particles tend to be fused together in the vessel during heating.

The pre-expanded particles of the polypropylene resin composition containing water thus obtained have an apparent expansion ratio of 25 to 70, preferably 30 to 60 times, a closed cell content of at least 85%, preferably at least 90%, and an average cell diameter of 50 to 500 $\mu$m, preferably 150 to 300 $\mu$m.

If the apparent expansion ratio is less than 25 times, flexibility and cushioning property of an obtained molded article become insufficient. On the other hand, if the apparent expansion ratio is more than 70 times, mechanical strength and heat resistance of a molded article become insufficient. Also, if the closed cell ratio is less than 85%, the pre-expanded particles lack the secondary expanding force, thus fusing failure occurs upon molding to deteriorate the mechanical strength and the like of the obtained molded article. If the average cell diameter is less than 50 $\mu$m, there arises a problem that the shape of molded article obtained from the pre-expanded particles is distorted. On the other hand, if the average cell diameter is more than 500 $\mu$m, mechanical strength of the molded article obtained from the pre-expanded particles is lowered.

In a DSC curve obtained by DSC measurement of the pre-expanded particles of polypropylene resin of the present invention, it is preferable that there is a peak at a higher temperature than the intrinsic peak based on the melting point of the polypropylene resin (A). If there is a peak at a higher temperature than the intrinsic peak of the polypropylene resin (A), moldability at in-mold molding becomes excellent, and a molded article having excellent mechanical strength and thermal resistance can be easily obtained.

The above-mentioned DSC curve of the pre-expanded particles of the polypropylene resin obtained by DSC measurement is the DSC curve obtained by heating 3 to 7 mg of the pre-expanded particles to 220° C. at a heating rate of 10° C./min by using DSC.

It is thought that the intrinsic peak of the polypropylene resin (A) is an intrinsic exothermic peak obtained by a DSC curve of the polypropylene resin (A) as a base resin of the pre-expanded particles, namely, an exothermic peak at melting of polymer crystalline. On the other hand, it is thought that the higher peak is a peak appeared at higher temperature than the intrinsic peak, and the peak is based on the presence of the secondary crystalline occurred at preparation of the pre-expanded particles. At preparation of the pre-expanded particles, the secondary crystalline is generally formed by heating and maintaining at a temperature range of at least the melting point of the polypropylene resin (A) to at most the melt completion temperature thereof. Temperature difference between these two temperatures is preferably large, more preferably at least 5° C., particularly preferably at least 10° C. Heat of fusion at a higher temperature is preferably 5 to 60 J/g, more preferably 15 to 35 J/g. Heat fusion ratio of the intrinsic peak and the hpeak at higher temperature is preferably 10 to 50%, more preferably 20 to 40%.

Since the pre-expanded particles of polypropylene resin of the present invention has the closed cell ratio of at least 85%, the expanded article having the same shape as a mold may be prepared by introducing the pre-expanded particles into a mold after impregnation of air by processing them in a pressure vessel under heating and pressuring for constant time, and then by thermally forming them by the method such as vapor heating, if desired.

The formed article thus obtained is excellent in flexibility and cushioning property, and also mechanical strength, heat resistance, water resistance, and the commodity value thereof is extremely high.

EXAMPLES

The present invention is then explained by means of examples and comparative examples, in which all parts are by weight unless otherwise noted. It is to be understood that the present invention is not limited to these examples.

The materials and the evaluation methods in examples and comparative examples are shown below.

Polypropylene Resin (A)

PP(A1): a random copolymer of ethylene and propylene, melt flow rate (230° C., 2.16 kg load) of 23 g/10 min, tensile elongation at break of 500%, ethylene content of 3% by weight, melting point of 148° C., melt completion temperature of the melting point of 162° C.

PP(A2): a random copolymer of ethylene and propylene, melt flow rate (230° C., 2.16 kg load) of 35 g/10 min, tensile elongation at break of 500%, ethylene content of 3% by weight, melting point of 147° C., melt completion temperature of the melting point of 165° C.

PP(A3): a random copolymer of ethylene and propylene, melt flow rate (230° C., 2.16 kg load) of 50 g/10 min, tensile elongation at break of 500%, ethylene content of 3% by weight, melting point of 148° C., melt completion temperature of the melting point of 161° C.

PP(A4): a random copolymer of ethylene and propylene, melt flow rate (230° C., 2.16 kg load) of 6 g/10min, tensile elongation at break of 600%, ethylene content of 3% by weight, melting point of 145° C., melt completion temperature of the melting point of 160° C.

PP(A5): a random copolymer of ethylene and propylene, melt flow rate (230° C., 2.16 kg load) of 23 g/10min, tensile elongation at break of 200%, ethylene content of 3% by weight, melting point of 148° C., melt completion temperature of the melting point of 161° C.

PP(A6): a random copolymer of ethylene and propylene, melt flow rate (230° C., 2.16 kg load) of 50 g/10min, tensile elongation at break of 100%, ethylene content of 3% by weight, melting point of 144° C., melt completion temperature of the melting point of 160° C.

PP(A7): a random copolymer of ethylene and propylene, melt flow rate (230° C., 2.16 kg load) of 65 g/10min, tensile elongation at break of 50%, ethylene content of 3% by weight, melting point of 146° C., melt completion temperature of the melting point of 160° C.

Hydrophilic polymer (B): an ionomer (a copolymer of ethylene and methacrylic acid having carboxyl group neutralized by sodium ion), water absorption ratio of 1% by weight, neutralization ratio of 60%.

Filler (C): talc (average particle diameter of 9 μm)

(Apparent expansion ratio)

The obtained pre-expanded particles were placed gently in a beaker of 1 liter internal volume in such an amount to be leveled after, and were leveled at the top of beaker with a plate without applying vibration, and the weight of the pre-expanded particles in the beaker was weighed to calculate an apparent density. The density of particle of a water-containing polypropylene resin composition used for obtaining the pre-expanded particles was divided by the apparent density to obtain a value which was adopted as an apparent expansion ratio.

(Closed cell ratio)

The volume of closed cells of the obtained pre-expanded particles was obtained by using an air-comparing type specific gravity meter (manufactured by Beckman, Model 930), and the closed cell ratio was calculated by dividing the resulting closed cell volume by the apparent volume which had been obtained separately by a submerging method.

(Average cell diameter)

Thirty pre-expanded particles were collected randomly from the obtained pre-expanded particles, and the cell diameter was measured according to JIS K 6402, to calculate the average cell diameter.

(Variation in cells)

The ratio of standard deviation (σ) representing variation in cell diameter to average cell diameter (d) (hereinafter referred to as U"):

$$U=(\sigma/d)\times 100\ (\%)$$

was obtained, and the variation in cells was evaluated according to the following criteria. The smaller the U value, the cells are more uniform.

○: U value is less than 35%.

Δ: U value is 35 to 45%.

X: U value exceeds 45%.

(Intrinsic peak temperature and higher peak temperature according to a DSC curve)

A DSC curve was obtained by heating 5 mg of the pre-expanded particles to 220° C. at a heating rate of 10° C./min by using a differential scanning calorimeter (made by Seiko Electric Industry, SSC5200). The peak temperature of the endothermic peak at a lower temperature was regarded as an intrinsic temperature. On the other hand, the peak temperature of the endothermic peak at a higher temperature was regarded as a higher peak temperature.

(Mechanical strength)

A molded article was prepared from the obtained pre-expanded particles. Specific compressive strength P (kg/cm$^2$) was calculated by dividing a compressive strength (kg/cm$^2$) at 50% compressive strain obtained according to NDS Z0504 by the specific gravity of the molded article. The mechanical strength was evaluated according to the following criteria.

○: P value exceeds 50 kg/cm$^2$.

Δ: P value is 30 to 50 kg/cm$^2$.

X: P value is less than 30 kg/cm$^2$.

(Heat resistance)

A molded article was prepared from the obtained pre-expanded particles and thermal dimensional change rate S (%) was calculated according to JIS K 6767 except that a temperature of 110° C. was used. The heat resistance was evaluated according to the following criteria.

○: S value is less than 5%.

Δ: S value is 5 to 15%.

X: S value exceeds 15%.

(Water resistance)

A molded article was prepared from the obtained pre-expanded particles and water absorption ratio QV (g/cm$^3$) was calculated according to JIS K 6767, method B. The water resistance was evaluated according to the following criteria.

○: QV value is less than 0.02 g/cm$^3$.

Δ: QV value is 0.02 to 0.05 g/cm$^3$.

X: QV value exceeds 0.05 g/cm$^3$.

(Flexibility)

A molded article was prepared from the obtained pre-expanded particles and tensile elongation ε(%) was calculated according to JIS K 6767. The flexibility was evaluated according to the following criteria.

○: ε value exceeds 15%.

Δ: ε value is 5 to 15%.

X: ε value is less than 5%.

(Cushioning property)

A molded article was prepared from the obtained pre-expanded particles and cushion factor C and maximum stress δ max (kg/cm$^2$) were calculated according to JIS Z 0235. The cushioning property was evaluated according to the following criteria.

○: C value is less than 3 and δ max value is less than 4 kg/cm$^2$.

Δ: C value is less than 3 and δ max value is at least 4 kg/cm$^2$, or C value is at least 3 and δ max value is less than 4 kg/cm$^2$.

X : C value is at least 3 and δ max value is at least 4 kg/cm$^2$.

Examples 1 to 7 and Comparative Examples 1 to 6

The materials shown in table 1 were supplied to a 50 mm single-screw extruder in amounts shown in Table 1. After they were kneaded at 230° C., they were extruded from the cylindrical die having diameter of 2 mm. They were cut by a cutter after cooling to obtain the cylindrical particles (diameter of a cross section 1 mm, length 3 mm) of the water-containing polypropylene resin composition (2 mg/particle). The water content thereof was measured by the method mentioned in DETAILED DESCRIPTION.

Then, 100 parts of the pellets, 1 part of powdery basic tricalcium phosphate as a dispersing agent, 0.05 part of sodium n-paraffmsulfonate were placed in a sealed vessel together with 300 parts of water. The content was heated to the temperature shown in Table 2 for 90 minutes and maintained at the temperature for 30 minutes. At that time, the pressure was about 5 kg/cm$^2$ G.

Thereafter, while holding the pressure in the vessel at the foaming pressure shown in Table 2 by introducing compressed air into the vessel, a valve provided at a lower part of the vessel was opened to release the aqueous dispersion (water-containing resin particles and aqueous dispersion medium) into an atmospheric pressure to carry out pre-expansion, and thereby to obtain the pre-expanded particles.

As properties of the obtained pre-expanded particles, the following properties were measured and evaluated: an apparent expansion ratio, a closed cell ratio, an average cell diameter, variation in cells thereof and the intrinsic peak temperature and the peak temperature at the higher temperature in the DSC curve.

After introducing two atmospheric pressure of inner pressure into the above-mentioned pre-expanded particles by using air, a mold was filled with the pre-expanded particles. The particles were heated and expanded by using vapor having 3 to 4 kg/cm² G to obtain a molded articles having 290 mm×270 mm×40 mm. As properties of the obtained molded article, the following properties were measured and evaluated: mechanical strength, heat resistance, water resistance, flexibility, and cushioning property. The results thereof are shown in Table 2.

TABLE 1

| | Compositions of water-containing polypropylene resin composition (parts) | | | | | | | | | Water content |
|---|---|---|---|---|---|---|---|---|---|---|
| | PP (A1) | PP (A2) | PP (A3) | PP (A4) | PP (A5) | PP (A6) | PP (A7) | Hydrophilic polymer (B) | Filler (C) | (% by weight) |
| Example No. | | | | | | | | | | |
| 1 | 100 | | | | | | | 5 | 1 | 5 |
| 2 | 100 | | | | | | | 5 | 1 | 5 |
| 3 | 100 | | | | | | | 5 | 1 | 5 |
| 4 | 100 | | | | | | | 2 | 0 | 2 |
| 5 | | 100 | | | | | | 2 | 1 | 2 |
| 6 | | 100 | | | | | | 2 | 0 | 2 |
| 7 | | | 100 | | | | | 1 | 1 | 1 |
| Comparative Example No. | | | | | | | | | | |
| 1 | | | | 100 | | | | 5 | 1 | 5 |
| 2 | | | | 100 | | | | 10 | 1 | 10 |
| 3 | 100 | | | | | | | 2 | 0 | 2 |
| 4 | | | | | | 100 | | 2 | 2 | 1 |
| 5 | | | | | 100 | | | 1 | 1 | 1 |
| 6 | | | | | | | 100 | 5 | 1 | 5 |

TABLE 2

| | Properties of the pre-expanded particles | | | | | | | | | | | | |
|---|---|---|---|---|---|---|---|---|---|---|---|---|---|
| | Expansion condition | | | | Average | | DSC curve | | Properties of the foamed article | | | | |
| | Heating | Expansion | Apparent | Closed | cell | | Intrinsic | Higher peak | | | | | |
| | temperature (° C.) | pressure (kg/cm²G) | expansion ratio (times) | cell content (%) | diameter (μm) | Variation in cells | temperature (° C.) | temperature (° C.) | Mechanical strength | Heat resistance | Water resistance | Flexibility | Cushioning property |
| Example No. | | | | | | | | | | | | | |
| 1 | 156 | 30 | 48 | 97 | 210 | ○ | 145 | 163 | ○ | ○ | ○ | ○ | ○ |
| 2 | 156 | 40 | 55 | 96 | 180 | ○ | 145 | 163 | ○ | ○ | ○ | ○ | ○ |
| 3 | 156 | 50 | 58 | 92 | 150 | ○ | 145 | 163 | ○ | ○ | ○ | ○ | ○ |
| 4 | 156 | 30 | 31 | 99 | 290 | ○ | 145 | 163 | ○ | ○ | ○ | ○ | ○ |
| 5 | 156 | 30 | 33 | 98 | 170 | ○ | 144 | 161 | ○ | ○ | ○ | ○ | ○ |
| 6 | 156 | 40 | 35 | 96 | 260 | ○ | 144 | 161 | ○ | ○ | ○ | ○ | ○ |
| 7 | 155 | 50 | 30 | 91 | 150 | ○ | 144 | 162 | ○ | ○ | ○ | ○ | ○ |
| Comparative Example No. | | | | | | | | | | | | | |
| 1 | 155 | 30 | 18 | 96 | 210 | ○ | 141 | 160 | ○ | ○ | ○ | ○ | ○ |
| 2 | 155 | 50 | 35 | 87 | 150 | ○ | 140 | 160 | X | Δ | ○ | ○ | Δ |
| 3 | 163 | 30 | — | — | — | — | 144 | — | X | X | X | X | X |
| 4 | 156 | 30 | 30 | 96 | 270 | ○ | 144 | 162 | ○ | ○ | ○ | X | Δ |
| 5 | 155 | 50 | 28 | 82 | 110 | ○ | 139 | 158 | Δ | ○ | ○ | X | Δ |
| 6 | 155 | 40 | 22 | 77 | 70 | X | 140 | 160 | X | X | ○ | X | X |

It is clear from the results shown in Table 2 that the pre-expanded particles having a high expansion ratio (apparent expansion ratio of at least 30) and a high closed cell ratio (at least 90%) are obtained, which have uniform fine foams in the pre-expanded particles obtained in Examples 1 to 7, in spite of the low amount of the hydrophilic polymer (B) and the filler (C). And the molded articles obtained from these pre-expanded particles are excellent in flexibility, cushioning property, mechanical strength, heat resistance, and water resistance.

On the other hand, the molded articles having an apparent expansion ratio of at least 25 times and excellent properties are not obtained in Comparative Examples 1 to 6.

Especially, since the pre-expanded particles obtained in Comparative Example 3 shrink largely, an apparent expansion ratio, a closed cell ratio, an average cell diameter, variation in cells thereof can not be measured, and there is no peak at a higher temperature in a DSC curve. The obtained molded articles deform largely, and properties thereof are not sufficient.

By using the water-containing polypropylene resin composition of the present invention, eve if a conventional volatile foaming agent or carbon dioxide gas is not employed, the pre-expanded particles can be obtained, which have excellent properties such as 25 to 70 times of an apparent expansion ratio, at least 85% of a closed cell ratio, and 50 to 500 μm of an average cell diameter.

And by in-mold molding by using the pre-expanded particles of the present invention, the formed article can be obtained, which is excellent in flexibility, cushioning property, mechanical strength, heat resistance, and water resistance, since the expansion ratio is high.

Therefore, the pre-expanded particles of the present invention can be applied to applications such as the cushioning material, which requires excellent flexibility and cushioning property.

What is claimed is:

1. A pre-expanded particle of a polypropylene resin prepared by pre-expanding a water-containing polypropylene resin composition comprising (A) 100 parts by weight of a polypropylene resin having melt flow rate (230° C., 2.16 kg load) of 10 to 70 g/10min and tensile elongation at break of at least 300%, (B) 0.05 to 10 parts by weight of a hydrophilic polymer, and (C) 0 to 3 parts by weight of a filler and having a water content of 1 to 20% by weight under a water vapor pressure at the melting point of the polypropylene resin, said particle having an apparent expansion ratio of 25 to 70 times, a closed cell content of at least 85% and an average cell diameter of 50 to 500 μm.

2. The pre-expanded particle of a polypropylene resin of claim 1, wherein the polypropylene resin is a random copolymer of ethylene and propylene.

3. The pre-expanded particle of a polypropylene resin of claim 1, wherein the hydrophilic polymer is an ionomer resin comprising a copolymer of ethylene and (meth)acrylic acid crosslinked intermolecularly with a metal ion.

4. The pre-expanded particle of a polypropylene resin of claim 3, wherein the metal ion is an alkali metal ion.

5. The pre-expanded particle of a polypropylene resin of claim 1, wherein the filler is a talc.

6. The pre-expanded particle of a polypropylene resin of claim 1, which has a peak at a temperature higher than an intrinsic peak temperature based on a melting point of a polypropylene resin in a DSC curve measured by differential scanning calorimeter.

* * * * *